Aug. 15, 1961    H. GERSHON    2,996,383
ANIMAL FEED CONTAINING BLOOD MEAL AND
METHOD OF PREPARING THE SAME
Filed March 21, 1960

NUTRITIVE VALUE (G/C) VS. BLOOD MEAL PRESSURE TREATMENT (psig)

FEED EFFICIENCY (G/F) VS. BLOOD MEAL PRESSURE TREATMENT (psig)

INVENTOR.
HERMAN GERSHON
BY
Sweedler and Zucker
ATTORNEYS

United States Patent Office 2,996,383
Patented Aug. 15, 1961

2,996,383
ANIMAL FEED CONTAINING BLOOD MEAL AND METHOD OF PREPARING THE SAME
Herman Gershon, North Bergen, N.J., assignor to Pfister Chemical Works, Inc., Ridgefield, N.J., a corporation of New Jersey
Filed Mar. 21, 1960, Ser. No. 16,498
12 Claims. (Cl. 99—7)

This invention relates to novel protein supplements for improving the nutritional value of animal feeds, and to the method of preparation thereof. In particular, the invention concerns the use of a heat modified whole animal blood as such a protein supplement for animal nutrition.

Blood meal has previously been considered as a protein supplement in animal feeds. Since large quantities of blood meal are annually available in the United States (about 160,000 tons) and since blood meal contains about 75% protein and is an excellent source of lysine and tryptophane, nutritionists have attempted for many years to utilize this material in animal rations. However, relatively little blood meal has been used in animal feeds, due in part to various investigations indicating the unpalatability, poor digestibility and low biological value of the commercially available blood meal. Data presented in one such investigation indicates that finely ground dried animal blood is only about 50% digestible.

It is among the objects of the present invention to provide a method of treating whole animal blood or the finely ground dried meal prepared therefrom to improve its availability for animal nutrition.

A further object of the present invention is the provision of protein supplements and animal feeds containing the thus treated blood which have augmented nutritive values and feed efficiencies.

Another object of this invention is to provide protein supplements and animal feed compositions containing keratin in combination with a treated animal blood, which compositions produce vastly improved growth patterns in animals.

Figure 1:
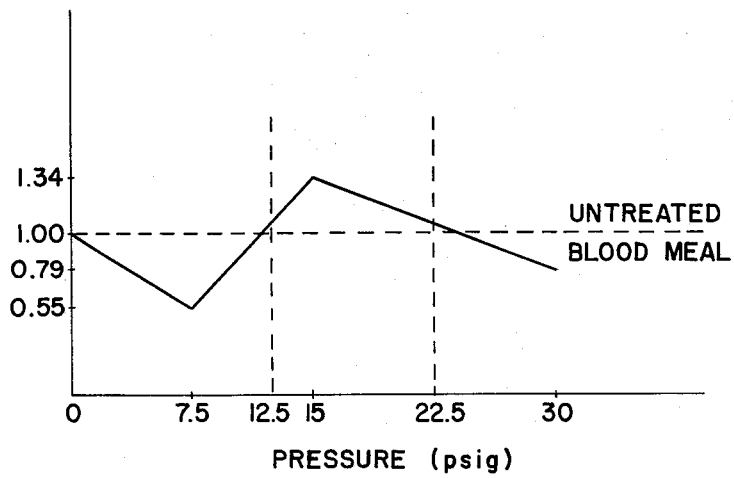
Figure 2:
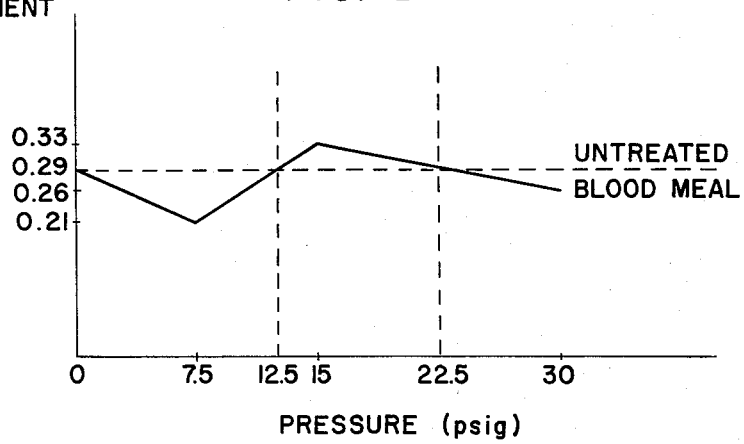

Other and further objects of the invention will appear obvious hereinafter from the following detailed description of the invention and the attached drawing, in which, FIGURE 1 is a graph showing the improved nutritive values of feeds prepared according to this invention; and
FIGURE 2 is a graph showing the improved feed efficiencies of feeds prepared according to the invention.

It has been found according to the present invention that a protein supplement for mixed animal feeds inducing superior growth responses may be provided by heating whole blood in the presence of moisture under a pressure of from about 12.5 to 22.5 p.s.i.g. for from about one-half to two hours, drying the blood, preferably at about 70° C., and grinding the dried material to produce a treated blood meal. Animal feeds containing the thus treated blood meal produce animal growth unexpectedly superior to that achieved with feeds containing untreated blood meal.

According to a further feature of this invention, additional novel protein supplements for mixed animal feeds are provided by heating whole blood in the presence of moisture under a pressure of from about 12.5 to 22.5 p.s.i.g. for from about one-half to two hours, drying the blood, preferably at about 70° C., grinding the dried material and blending the resultant treated meal with keratin. This supplement, containing a mixture of keratin and the treated blood meal, has been found to exhibit surprising growth responses substantially greater than the growth responses obtained from the supplementation of untreated blood meal with keratin. The treated blood meal-keratin protein supplement, when added to a basal ration, produces a mixed animal feed which promotes animal growth in a manner unexpectedly superior to that resulting from feed containing blends of untreated blood meal and keratin supplements.

The blood which is treated according to the present invention may be fresh whole animal blood or the commercial blood meal which comprises finely ground dried whole animal blood. This whole blood, whether fresh or pre-dried and ground, contains fibrin, serum and blood cells.

According to the treatment of the invention, the whole blood is subjected to moist heat such as is available in the common autoclave type of pressure cooker, for periods ranging from about one-half to two hours under pressures of from about 12.5 to 22.5 p.s.i.g. The fresh blood may be treated in the above fashion directly by the meat packer, for example, or, if desired, a subsequent processor may autoclave the commercial dried blood meal after first slurrying it in water. Preferably, the whole blood is autoclaved for about an hour while maintaining the pressure at 15 p.s.i.g.

Subsequently the treated blood is dried, preferably at about 70° C. Thereafter the material is ground and a treated blood meal, according to the present invention, results.

It is believed that the heat treatment partially hydrolyzes the proteinaceous content of the blood, effecting vast improvement in the digestibility and biological value of the processed blood meal protein supplement and the feeds containing the same. It will be understood, of course, that this explanation is intended as illustrative and is not limiting as to the scope of the processes and compositions of the instant invention.

Whole blood meal treated as above described may then be admixed as a protein supplement with animal feeds containing other vitamin and mineral ingredients. Such feeds contain protein sources such as ground yellow corn, soy bean oil meal and, in accordance with this invention, keratin from, for example, hydrolyzed feather meal or from hoof meal. Mineral components such as dicalcium phosphate, calcite flour, sodium chloride, or trace mineral mixes such as Delamix, which contains 6% Mn, 2% Fe, 0.2% Cu, 0.02% Co and 0.12% I, are also contained in the feed. Additionally, vitamin supplements supplying niacin, riboflavin, vitamins A, $B_{12}$, E, $D_3$, K, or sources of procaine penicillin or pantothenic acid may be included in the feed mixture. Other growth factors such as folic acid may also be included therein.

Of special importance are those protein supplements containing admixtures of keratin and the treated blood meal. Hoof meal, or hydrolyzed feather meal as prepared, for example, by the method disclosed in United States Patent 2,702,245 of February 15, 1955, serve as sources of keratin. Feeds containing such an admixture surprisingly result in extremely high growth rates and feed efficiences as will be described hereinafter.

Additionally, it has been found that blends of keratin and the treated blood meal when substituted for soy bean oil meal protein supplements, in amounts of up to about 20% of the soy bean oil meal present in the feed, serve to improve the feed efficiency of the mixed feed employed.

*Example I.—Preparation of protein supplements containing treated blood meals*

Four samples of commercially available blood meal (BMc), each taken from the same batch and of equal weight, were provided. Three of the samples were slurried in water and autoclaved at 7.5 p.s.i.g., 15 p.s.i.g. and 30 p.s.i.g., respectively, for one hour. Thereafter, each of the autoclaved samples was dried at 70° C. and finely ground.

Example II.—Preparation of animal feeds containing treated blood meals

Four samples of a basal feed ration, each composed of the following parts by weight, were prepared:

|  | Parts |
|---|---|
| Ground yellow corn | 59.75 |
| Dicalcium phosphate (21% phosphorus) | 2.00 |
| Calcite flour | 1.80 |
| Sodium chloride | 0.50 |
| Premix | 0.95 |
|  | 65.00 |

The premix consisted of the following growth factors:

|  | Percent |
|---|---|
| B.Y.-500 (riboflavin, 227 mg./lb.) | 60 |
| Choline chloride (25%) | 15.6 |
| Delamix | 10.0 |
| Merck's vitamin $B_{12}$ supplement "6" (6 mg. vitamin $B_{12}$/lb.) | 7.0 |
| Nopcay "10" (vitamin A, 10,000 I.U./g.) | 3.5 |
| Myvamix (20,000 I.U. vitamin E/lb.) | 2.5 |
| Delsterol (vitamin $D_3$, 1,500 I.C.U./g.) | 1.0 |
| Niacin | 0.2 |
| Procaine penicillin supplement (Merck's Pro-Pen 50%) | 0.11 |
| Folic acid (10%) | 0.04 |
| Calcium pantothenate | 0.03 |
| Klotogen F (285,762 mg. vitamin K/lb.) | 0.02 |
|  | 100.00 |

Samples of four distinct protein supplements (thirty-five parts each) were prepared for admixture with each sixty-five part sample of the basal ration, the latter prepared as described above. In order to provide isonitrogenous feed substitution, protein supplements providing 44% protein content were prepared by admixing each of the blood meal samples prepared in Example I with the following amounts of Solka Floc, respectively:

| Feed Protein Supplement | Blood Meal (parts) | Solka Floc (parts) |
|---|---|---|
| BMc | 13.6 | 21.4 |
| Treated Blood meal (7.5 p.s.i.g.) | 15.4 | 19.6 |
| Treated blood meal (15 p.s.i.g.) | 14.6 | 20.4 |
| Treated blood meal (30 p.s.i.g.) | 13.2 | 21.8 |

The protein supplements were then thoroughly mixed with the basal rations and mixed feeds containing the protein supplements of Example I in isonitrogenous substitution were produced.

Example III.—Effect of pressure on nutritional value of blood meal protein supplements The four feeds prepared as in Example II were fed to duplicate test groups of twenty Nichol's cross 108 cockerels for four weeks. The chicks were maintained in heated batteries on wire mesh floors and given feed and water ad libitum.

At the end of the four week period the gain in weight (G) for each of the test groups and the amount of feed (F) consumed by each such group was determined. The gain in weight (C) of the group fed with the feed containing the untreated commercially available blood meal (BMc) was used as a control to determine the relative nutritive values (G/C) of the respective feeds. The feed efficiencies (G/F) were also determined and are set forth in the table below:

| Feed Protein Supplement | G/C | G/F |
|---|---|---|
| BMc | 1.00 | 0.29 |
| Treated blood meal (7.5 p.s.i.g.) | 0.55 | 0.21 |
| Treated blood meal (15 p.s.i.g.) | 1.34 | 0.33 |
| Treated blood meal (30 p.s.i.g.) | 0.79 | 0.26 |

In the accompanying drawing, FIGURE 1 is a plot of the relative nutritive values (G/C) of the respective feeds as a function of the pressure treatment to which they have been subjected according to the process of this invention.

FIGURE 2 is a plot of the feed efficiencies (G/F) as a function of the pressure treatments applied.

It can be seen from these drawings that the untreated blood meal (BMc) exhibits nutritive values (G/C) and feed efficiencies (G/F) given by the dashed horizontal lines in each figure. The nutritive values and feed efficiencies of the untreated blood meal are surpassed by feeds containing whole blood treated by the process of this invention, which blood has been subjected to a moist heat treatment at pressures ranging from about 12.5 to 22.5 p.s.i.g., as shown by the dashed vertical lines in FIGURES 1 and 2. The maximum nutritive values and feed efficiencies occur, as shown in the drawing, when the blood is autoclaved at 15 p.s.i.g.

Example IV.—Nutritional values of protein supplements composed of blood meals blended with keratin Samples of BMc and blood meal autoclaved according to the procedure of Example I at 15 p.s.i.g. (BMa) were prepared. Equal portions, based on nitrogen content, of each of these samples were admixed with keratin in the following blends:

$B_5$=50% BMc, 50% hydrolyzed feather meal
$B_6$=50% BMa, 50% hydrolyzed feather meal
$B_7$=50% BMc, 25% hydrolyzed feather meal, 25% hoof meal
$B_8$=50% BMa, 25% hydrolyzed feather meal, 25% hoof meal The feed blends were fed to duplicate groups of chicks following the procedure of Example III and the G/C and G/F ratios were computed as follows:

| Feed Protein Supplement | G/C | G/F |
|---|---|---|
| BMc | 1.00 | 0.29 |
| BMa | 1.34 | 0.33 |
| $B_5$ | 1.48 | 0.32 |
| $B_6$ | 2.07 | 0.39 |
| $B_7$ | 1.48 | 0.32 |
| $B_8$ | 2.03 | 0.35 |

From this data, it can be seen that the blends of BMa with keratin ($B_6$, $B_8$) produce 39.8% and 37.2% greater growth, respectively, than the corresponding blends of BMc with keratin ($B_5$, $B_7$) whereas BMa itself only produces approximately 34% greater growth than BMc. If the enhanced growth response due to feeds containing BMa and keratin ($B_6$, $B_8$) were due only to the BMa, in contrast to the conventional BMc, only about 34% growth increase would be expected. Hence, it can be concluded that the additional growth increase is attributable to a synergistic effect resulting from the combination, as a protein supplement, of the improved blood meal and keratin.

Example V.—Nutritional values of protein supplements composed of soy bean oil meal blended with treated blood meal and keratin Five samples, each containing 65 parts by weight, of the basal ration prepared, as described in Example II, were provided. To these samples thirty-five parts of the protein supplements indicated in the table below were isonitrogenously added to produce mixed feeds and the feeds fed to duplicate groups of chicks according to the procedure of Example III. The various protein supplements utilized and the feed efficiencies (G/F) obtained therewith were as follows:

| Protein Supplement in Feed | G/F |
|---|---|
| 100% soy bean oil meal | 0.48 |
| 95% soy bean oil meal, 5% B$_s$ (prepared as in Example IV) | 0.52 |
| 85% soy bean oil meal, 15% B$_s$ | 0.49 |
| 75% soy bean oil meal, 25% B$_s$ | 0.46 |
| 50% soy bean oil meal, 50% B$_s$ | 0.43 |
| 100% B$_s$ | 0.33 |

Thus, the feed efficiency of soy bean oil feeds is increased, by the substitution of up to about 20% of the soy bean oil meal, by blends of heat treated blood meal and keratin.

It is noted that the present invention provides a process for treating whole blood to improve its availability for animal nutrition, and protein supplements for animal feeds containing such treated blood alone or together with keratin, which have improved nutritive values and feed efficiencies.

Since changes in the procedure for preparing the treated blood meal and in the compositions of the novel protein supplements and animal feeds may be made without departing from the scope of the invention, it is intended that all matter contained in the above description shall be interpreted as illustrative and not in a limiting sense.

What is claimed is:

1. A method of preparing a protein supplement for mixed animal feeds comprising the steps of heating an aqueous slurry of animal blood under a pressure of from 12.5 to 22.5 p.s.i.g. for one-half to two hours, drying said slurry and grinding the thus dried material to produc a treated blood meal having beneficial nutritional values.

2. The method as defined in claim 1, in which said heating step is performed under a pressure of 15 p.s.i.g. for a period of one hour and the resulting heated material is dried at 70° C.

3. A method of preparing a mixed animal feed inducing superior growth response comprising the steps of heating an aqueous slurry of finely ground dried animal blood, under a pressure of from 12.5 to 22.5 p.s.i.g. for from one-half to two hours, drying the blood, grinding the thus dried material to produce a treated blood meal and admixing said meal with a basal ration to provide an animal feed having a high nutritional value.

4. The method as defined in claim 3, in which said heating step is performed under a pressure of 15 p.s.i.g. for a duration of one hour and said heated material is dried at 70° C.

5. A method of preparing a protein supplement for animal feeds inducing superior growth response comprising the steps of heating an aqueous slurry of a finely ground dried animal blood under a pressure of from 12.5 to 22.5 p.s.i.g. for one-half to two hours, drying the heated blood, grinding the thus dried material to produce a treated blood meal and blending said treated blood meal with keratin to produce a protein supplement having beneficial nutritional values.

6. A method of preparing an animal feed having improved growth effects comprising the steps of heating an aqueous slurry of a finely ground dried animal blood under a pressure of from 12.5 to 22.5 p.s.i.g. for one-half to two hours, drying the heated blood, grinding the thus treated material to produce a treated blood meal having beneficial nutritional values, blending said treated blood meal with keratin to produce a novel protein supplement and adding said supplement to a basal ration in order to provide an improved feed.

7. The method defined in claim 6 in which said supplement is added to an animal feed containing soy bean oil meal, said supplement being substituted for said soy bean oil meal in amounts up to 20% of the amount of said soy bean oil meal present in said feed in order to provide a mixed animal feed possessing a high feed efficiency.

8. A protein supplement having augmented nutritive values comprising a treated blood meal prepared in accordance with claim 1.

9. A mixed animal feed inducing superior growth response comprising a basal ration in admixture with a protein supplement as defined in claim 8.

10. A protein supplement having augmented nutritive values containing, in admixture, keratin and a treated blood meal prepared in accordance with claim 1.

11. A mixed animal feed capable of inducing superior growth response comprising a basal ration in admixture with a protein supplement as defined in claim 10.

12. A mixed animal feed capable of inducing superior growth response comprising, in admixture, a basal ration and a protein supplement, said supplement comprising at least 80% soy bean oil meal and up to 20% of keratin admixed with a treated bood meal, said blood meal prepared in accordance with claim 1.

References Cited in the file of this patent

UNITED STATES PATENTS

| 653,956 | Hamilton | July 17, 1900 |
| 2,165,721 | Norman | July 11, 1939 |
| 2,165,722 | Norman | July 11, 1939 |
| 2,597,566 | Chiego | May 20, 1952 |

FOREIGN PATENTS

| 463,464 | Great Britain | Mar. 31, 1937 |

OTHER REFERENCES

"The Use of Blood Meal in Livestock Feeds," by Rasmussen et al., Bulletin No. 39, October 1958, American Meat Institute Foundation, 939 East 57th St., Chicago 37, Illinois.